United States Patent
Schrader

[15] 3,668,939
[45] June 13, 1972

[54] PLANE OMNIDIRECTIONAL ABSORBER

[72] Inventor: Preston H. Schrader, Middletown, Ky.
[73] Assignee: Rex Chainbelt Inc., Milwaukee, Wis.
[22] Filed: Nov. 13, 1969
[21] Appl. No.: 876,457

[52] U.S. Cl. ..................74/61, 209/365 B, 198/220 CH, 188/1 R
[51] Int. Cl. ..................................................F16h 33/00
[58] Field of Search..................74/61; 188/1; 248/22; 244/75.6; 198/220 CA; 209/365 A, 365 B

[56] References Cited

UNITED STATES PATENTS

| | | | |
|---|---|---|---|
| 3,145,012 | 8/1964 | Kfoury | 188/1 |
| 3,246,073 | 4/1966 | Bouche et al. | 188/1 |
| 3,269,717 | 8/1966 | Beck | 248/22 |
| 3,191,716 | 6/1965 | Eitel | 248/22 |
| 3,430,902 | 3/1969 | Lohr | 188/1 |
| 3,188,644 | 6/1965 | Sielaff | 188/1 |
| 3,276,762 | 10/1966 | Thomas | 188/1 |
| 2,996,267 | 8/1961 | Warren | 244/75.6 |
| 2,361,071 | 10/1944 | Vang | 244/75.6 |
| 1,783,348 | 12/1930 | Taylor | 244/75.6 |
| 1,651,934 | 12/1927 | Sayers | 74/61 |
| 2,200,724 | 5/1940 | Robins | 74/61 |
| 2,140,970 | 12/1938 | Reedy | 74/61 |
| 2,636,719 | 4/1953 | O'Connor | 74/61 |
| 2,947,181 | 8/1960 | Carrier, Jr. et al. | 74/61 |
| 3,053,379 | 9/1962 | Roder et al. | 74/61 |
| 3,180,158 | 4/1965 | Morris | 74/61 |

*Primary Examiner*—William F. O'Dea
*Assistant Examiner*—Wesley S. Ratliff, Jr.
*Attorney*—Marshall and Yeasting

[57] ABSTRACT

A vibratory counterforce system for counterbalancing vibratory forces of constant frequency acting in a plane comprises at least one planar omnidirectional dynamic absorber, i.e. an auxiliary mass vibratory system, the natural frequency of which is substantially independent of the direction of vibration in the plane. When used in sets of two or more, and located at spaced apart points on a structure subject to vibratory forces of constant frequency, the absorbers act to minimize the vibration at their points of attachment and respond, both to translatory forces and to force couples. The absorbers or counterforce units are particularly useful when applied to the base of a vibratory conveyor because they can effectively counterbalance the vibratory forces applied to the base which vary both in amplitude and direction according to the load on the conveyor.

10 Claims, 6 Drawing Figures

INVENTOR.
PRESTON H. SCHRADER
BY
Marshall & Yeasting
ATTORNEYS

3,668,939

PLANE OMNIDIRECTIONAL ABSORBER

BACKGROUND OF THE INVENTION

It has been common practice in machines having moving masses that produce undesired vibration to add additional moving masses driven in phase opposition to the first masses to generate counterbalancing forces and thus minimize the vibration of the structure. Vibratory conveyors constructed according to this practice are shown in U.S. Pat. Nos. 2,700,472; 2,705,070; 2,922,514; 2,797,796.

The theory of dynamic vibration absorbers is described in the literature such as Shock and Vibration Handbook by Harris and Crede. Such a device consists of a weight coupled through a spring to the member subject to a constant frequency vibratory force. The device is tuned to have a natural frequency equal to the frequency of the disturbing force, and in operation vibrates at an amplitude and phase to oppose the disturbing force acting on the member. Such a system with frequency control and used to control the amplitude of vibration of an exciter member of a vibratory feeder or conveyor is shown and described in U.S. Pat. No. 3,238,798.

SUMMARY OF THE INVENTION

The invention comprises a two degree of freedom dynamic absorber or variable counterforce generator suitable for use either in single units to counterbalance vibratory forces of a given frequency acting along any axis in a plane or in sets of two or more applied to spaced apart points on a structure subject to a variable amplitude, fixed frequency vibratory forces to minimize vibration of the structure in response to such vibratory force couples or non-concurrent translatory vibratory forces. When used in sets with the individual dynamic absorbers spaced apart along the length of the structure the absorbers or counterforce generators minimize flexural vibration of the structure as well as vibratory motion of the structure as a rigid body.

The invention also includes the two degree of freedom dynamic absorber applied to the base of a vibrationally isolated vibratory conveyor to minimize vibration of the base regardless of whether the conveyor is operated in its loaded or unloaded condition.

DESCRIPTION OF THE PREFERRED EMBODIMENTS

Preferred examples of vibratory counterforces constructed according to the invention are illustrated in the accompanying drawings.

These specific figures and the accompanying description are intended merely to illustrate the invention and not to impose limitations on its scope.

Figure 1:
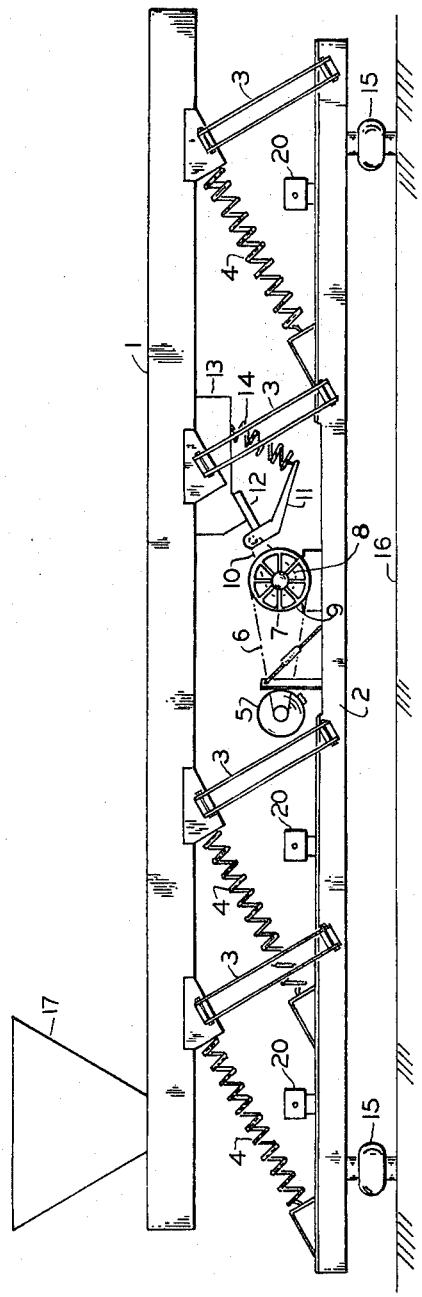
FIG. 1 is a side elevation showing a vibratory conveyor employing a number of the novel dynamic absorbers.

Referring to FIG. 1, a vibratory conveyor to which the novel dynamic absorbers are applied comprises a trough 1 that is supported from a base 2 by means of pairs of inclined cantilever guide springs 3 and coupling springs 4. The vibratory conveyor is driven by a motor 5 connected through a belt 6 to a pulley 7 mounted on an eccentric shaft 8. The shaft 8 is journaled on pillow blocks 9 erected from the base 2, and is connected, through a connecting rod 10, to one end of a lever 11. An intermediate pivot point of the lever 11 is connected to a rigid strut 12 extending from a bracket 13 attached to the underside of the conveyor trough 1. While the free end of the lever 11 may be restrained by a mass, a shock absorber, or other device to allow slow movement of the end of the lever, it is shown connected through a spring 14 to the bracket 13 to provide a resilient restraint.

The conveyor may, if the vibration transmitted to floor or building structure is not objectionable, be mounted with the base 2 rigidly attached to the floor. Very seldom is such a mounting acceptable to the user because of the dynamic reaction forces transmitted to the floor and through the floor to the surrounding areas. Therefore vibration isolation techniques are applied and the conveyor base 2 is supported, for example, on isolation springs such as their springs 15 located near the corners of the base and supporting the base from a foundation or floor 16. This is not a completely satisfactory solution to the problem, however, since if the air springs 15, or other isolation springs, are soft enough to adequately isolate the vibrations of the base 2 from the support 16 they are not stiff enough to satisfactorily hold the conveyor in position, particularly under changes in load being applied to the conveyor trough 1 by way of a chute 17. Furthermore, the conveyor trough 1 and the base 2 are elongated members which, in response to locally applied forces, may bend or otherwise deflect so that the amplitudes of vibration of the trough 1 at various points along its length may vary both in magnitude and phase which adversely affects the conveying action of the conveyor. When this occurs the material may convey normally through one portion of the trough and, in severe cases, may not convey at other portions of the trough.

The problem of reduction or the elimination of the vibration of the base 2 is further complicated by the fact that the load of material being conveyed on the trough 1 produces impact forces as it is tossed and caught on the trough which forces are transmitted through the cantilever springs 3 to the base 2. Since these forces vary with the magnitude of the load as well as its physical characteristics, conventional vibrating counterweights, (duplicating the trough as far as weight is concerned and vibrated in opposite phase to the motion of the trough 1 to apply a counterforce to the base 2) are not effective because they cannot be designed to vary automatically according to the load reaction of the load on the trough 1.

To minimize the vibration of the base 2, whether it be the vibration of the base as a rigid member or flexural vibration of the base itself, a series of omnidirectional dynamic vibration absorbers 20 are mounted on the base 2 at various points along its length. While the spacing of the absorbers 20 along the length of the base 2 is not critical it is preferable that they be located at those points which, in the absence of the absorbers, vibrate with the greatest amplitude.

The absorbers 20 may be located along the centerline of the conveyor or along the side frames of the base 2, either singly or in pairs in either arrangement. Preferably they are used in pairs.

It is a characteristic of each of the omnidirectional dynamic vibration absorbers 20 that it acts, at the operating frequency, to generate a counterforce that opposes at its location the vibration producing forces applied to the base 2 in both vertical and horizontal directions and regardless of the phasing or timing between the forces. If the horizontal and vertical components of disturbing forces to be counterbalanced are in time phase with each other the absorber generates a force acting along a straight line to meet the disturbing forces. If the components of the disturbing force are not in phase, the absorber element moves in an elliptical path to generate components of force in the horizontal and vertical directions which are in such phase and amplitude as to counterbalance the components of the disturbing force.

Figure 2:
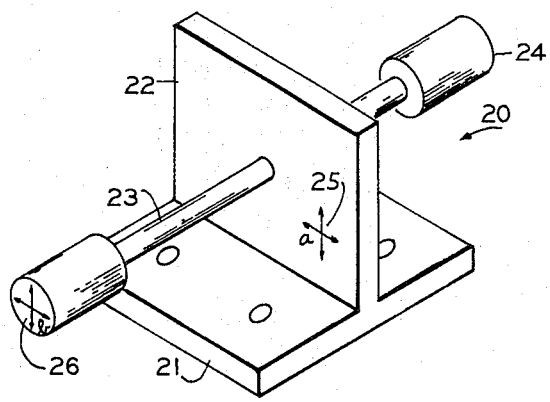
FIG. 2 is an isometric view of one form of the absorber.

One form of a dynamic absorber for a force counterbalance apparatus is shown in FIG. 2. As shown, this comprises a mounting bracket 21 adapted to be attached to or form part of the member whose vibration is to be minimized. The bracket 21 is positioned so that its upstanding flange 22 lies generally in the plane of the vibration to be counterbalanced. A cantilever spring 23, preferably in the form of a circular cross section rod is rigidly mounted in the upstanding flange 22 so as to extend transversely either side thereof. At each end it carries a weight 24 the center of gravity of which is symmetrical with respect to the axis of the rod 23.

Each weight 24, constituting a vibratory mass, cooperates with the rod 23, serving as a resilient means or a spring, to form a vibratory system constituting a dynamic absorber the natural frequency of which in any direction parallel to the flange 22 is closely equal to the frequency of the vibratory forces applied to the member or bracket 21 which forces are to be counterbalanced.

When the bracket 21 or the member to which the bracket is attached is vibrated with a motion in the plane of the flange 22 the vibratory system comprising the weight 24 and spring 23 partakes of the vibration. At low frequency, below the natural frequency of the vibratory system, the system and member move more or less as a unit. As the frequency of the disturbing force is increased the weights 24 execute a vibratory motion which is in the same direction as the motion of the flange 22 but at an increased amplitude. This causes an increased deflection in the spring 23 with the force applied to the flange being in the same direction as the deflection of the weights so that as far as the flange 22 is concerned the vibratory system appears to be a very large additional mass. Of course, the larger the mass attached to the flange 22 the smaller the vibration resulting from any particular disturbing force. Thus the closer the operating frequency of the disturbing force approaches the natural frequency of the vibratory system, approaching it from below, the larger the mass effect of the vibratory system of weight 24 and spring 23.

As the operating frequency of the disturbing forces applied to the member increases to a value above the natural frequency of the vibratory counterforce system the phase of the motion of the weight 24 with respect to the flange 22 reverses, i.e., when the flange 22 is at its maximum leftward position as indicated by the arrow A the weight 24 is moved to its maximum position in the opposite direction. Thus in effect the vibratory system of weight 24 and spring 23 appears, in so far as the flange 22 is concerned, as a very stiff spring attached to a rigid support.

Thus as long as the disturbing force has a frequency near the natural frequency of the vibratory counterforce system of weight 24 and spring 23 the vibratory system acts to minimize the resulting motion of the flange 22.

The straight steel rod 23 is representative of any spring arrangement having substantially the same spring rate in any direction of deflection in a plane parallel to the flange 22.

Figure 3:
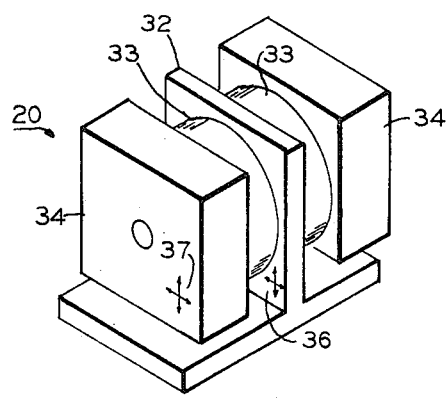
FIG. 3 is a perspective view of a preferred form of the absorber.
Figure 4:
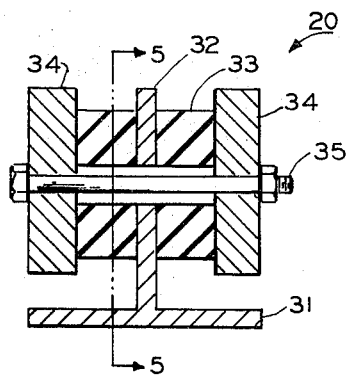
FIG. 4 is a transverse vertical section of the absorber shown in FIG. 3, as seen from the line 4—4 of FIG. 5.
Figure 5:
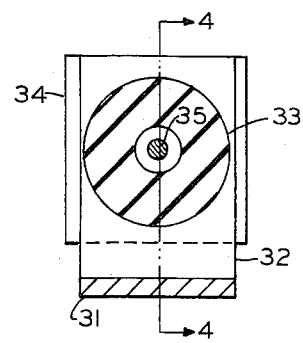
FIG. 5 is a longitudinal vertical section of the absorber as seen from the line 5—5 of FIG. 4.

The construction illustrated in FIG. 2 occupies considerable space when constructed to operate at low frequencies as commonly employed in vibratory conveyors. Accordingly, the construction as illustrated in FIGS. 3, 4 and 5 is much more economical of space and better adapted for the lower operating frequencies. In this arrangement, as shown, a bracket 31, which may conveniently be a short section of T-bar, is arranged such that the stem of the T provides a flange 32 forming part of the bracket 31. This flange 32 is sandwiched between a pair of annular elastomer springs 33 which are preferably made in an annular form. The springs 33 in turn are sandwiched between a pair of weights 34 constituting the masses of the vibratory counterforce. The whole assembly is compressed by a bolt 35 passing, with a snug fit, through the weights 34 and with ample clearance through axially aligned holes in the annular springs 33 and a clearance hole through the flange 32.

To avoid overstroking and thus overstressing the springs of the counterforce the system is preferably designed so that the total mass of the plurality of absorbers is somewhere in the order of from half to twice the mass of the trough member 1. However, the actual weight is not critical. The limiting factor is the fatigue limit of the absorber springs. What is important, however, is that the natural frequency of the weights on their springs, assuming that the bracket 31 including flange 32 is held stationary, shall be as near to the operating frequency of the crank and connecting rod drive producing motion of the trough 1 as reasonably possible. It is also important that this natural frequency shall be nearly the same, preferably exactly the same, along each direction as indicated by the direction arrows 37 or any other direction lying in the same plane. This is because the disturbing force, regardless of its direction whether longitudinally of the conveyor or vertically or any combination of these directions, has a frequency corresponding to the speed of rotation of the eccentric shaft. Furthermore, for maximum effectiveness the natural frequency of the dynamic absorber must be equal to this operating frequency.

Figure 6:
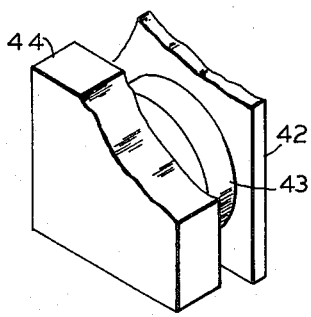
FIG. 6 is an isometric view of another form of the improved dynamic absorber.

It may be noted that in the forms of the absorber shown in FIG. 2 and in FIGS. 3, 4 and 5 the absorber is symmetrical either side of the flange 22 or 32. Thus there are two of the weights 24 located on opposite sides of the flange 22 and at generally equal distances on similar extensions of the circular spring rod 23. Likewise, in FIGS. 3, 4 and 5, there are two of the weights 34 symmetrically located on opposite sides of the flange 32. This construction is used so that the forces developed by deflection of the springs 23 or 33 do not apply a twisting moment or twisting effort to the flange 22 or 32 tending to deflect it out of its plane. If such a moment is not objectionable, as when a number of units are used at widely spaced points of a relatively rigid member, a construction as illustrated in FIG. 6 may be employed.

In this arrangement a portion of a member 42 whose motion is to be restricted has an elastomer spring 43 cemented or otherwise adhesively bonded or attached to a surface of the member 42 which surface lies in the plane of action of the disturbing vibratory forces. A mass or weight 44 is bonded to and carried on an opposite surface of the elastomer spring 43 for vibratory motion with respect to the portion of the member 42. In this arrangement, as in the previous arrangements, the spring 43 and mass 44 should, for best results, be symmetrical about a center line so that the spring force produced by the deflection of the spring 43 acts substantially through the center of gravity of the weight 44 and further such that the natural frequency of the weight 44 on the spring 43 is the same whether the vibration be horizontal, vertical or inclined.

As an example, a conveyor generally similar to that shown in FIG. 1 in which the trough member weighed approximately 700 pounds and the base 2 weighed approximately 1,300 pounds was operated with a relative stroke (double amplitude) between the trough 1 and base 2 of 1.1 inches. When such a conveyor is mounted on isolation springs and without a counterbalance, the strokes of the trough 1 and the base 2 are generally inversely proportional to their weights. Thus the base has a stroke of approximately 0.4 inch and the trough has a stroke of approximately 0.7 inch. Two assemblies such as that shown in FIG. 3 were located on each side of the base 2, one at each end, a total of 4 such absorber assemblies. The absorbers were pretuned to operate in resonance at an operating frequency corresponding to 475 cycles per minute. Each of the absorbers had a total weight of its members 34 equal to approximately 250 pounds or a total of 1,000 pounds.

When the conveyor was operated at no load the stroke of the base 2 was approximately 0.05 inch and the stroke of the trough was nearly 1.1 inches. The dynamic absorber strokes varied, i.e., the vibratory stroke of the masses 34 at one end of the conveyor base was approximately 0.65 of an inch and at the other end the strokes were approximately 0.8 of an inch.

When the conveyor was operated under a load of about 370 pounds being conveyed at a rate of about 80 feet per minute the stroke of the base increased slightly over the no load condition. However, one set of absorbers increased their strokes from 0.65 inch to nearly 0.9 of an inch, while the second set of absorbers decreased their stroke from 0.8 inch to approximately 0.62 of an inch.

It was also noted that in each condition of operation the absorber masses 34 moved in elliptical paths in planes parallel to the longitudinal vertical plane of the conveyor and that the shape and direction of the elliptical paths changed very markedly when the load was applied to the conveyor.

A very practical advantage of dynamic absorbers, such as shown in the figures, when used with vibratory apparatus is that the size of the absorbers is not critical. The only limitation is that the ratio of absorber weight to trough weight should be somewhere in the general order of 2:1. This insures that the absorbers will not overstroke during a normal operation. If the absorber weights are too small and the damping in the springs is small, as it should be, the absorbers increase their strokes to counterbalance the disturbing force applied to the base 2 and in so doing overstress the springs 33. The only critical requirement is that the natural frequency of the absorbers shall be as close as practical to the operating frequency of the drive.

The combination of the absorbers spaced apart along the base 2 provides the additional advantage that it is no longer necessary to adjust exactly the distribution of weight of the trough 1 or the base 2 longitudinally of the machine to prevent a rocking motion about a transverse axis when the conveyor is mounted on isolation springs. This is because the absorbers at each end of the machine act independently to enforce a minimum motion at that particular location. This was evident in the experimental machine because, in no condition of operation, was the stroke of the absorbers on one side of the machine at the opposite ends of the machine equal either in amplitude or in direction of motion.

While the base of an isolated vibratory conveyor has been selected as an example of a member subject to unbalanced vibratory forces because of the ability of the dynamic absorbers to automatically adjust to changes in load, the absorbers may be applied, with equal effectiveness, to any body subject to vibratory forces as long as the disturbing forces or the motion of unbalanced masses on the member occur at a constant frequency and the absorbers are tuned to that frequency. Furthermore, if the member is subjected to forces having components in all directions, a second set of absorbers may be added, these being arranged to act in a plane normal to the plane of the first set.

I claim:

1. An apparatus for doing work by vibration, comprising in combination, a work member, a base, resilient means connecting the work member to the base for relative vibration along a prescribed path, vibratory drive means acting between said members and base for vibrating the work member relative to the base along said path at a substantially constant frequency, vibration isolators supporting the base while allowing it to vibrate in response to vibratory forces produced by the vibration of the work member and the load thereon, and means for increasing the amplitude of vibration of the work member while minimizing the vibratory force transmitted through the vibration isolators to supporting structure comprising an auxiliary mass, and resilient means coupling the auxiliary mass to the base, said resilient means being yieldable at substantially the same spring rate along any line in a vertical plane including said path, said auxiliary mass and said resilient means having a resonant frequency that is independent of the direction of motion in said plane and that is substantially equal to the constant frequency of said drive means, whereby the motion of said base is reduced and the motion of the work member increased.

2. A vibratory apparatus according to claim 1 in which the resilient means comprise an elastomer spring.

3. A vibratory apparatus according to claim 2 in which the elastomer spring is bonded to an adjacent portion of the member and to the mass.

4. A vibratory apparatus according to claim 2 in which the elastomer spring is compressed between an adjacent portion of the member and the mass.

5. A vibratory apparatus according to claim 2 in which the elastomer spring is substantially circular in cross section.

6. A vibratory counterforce producing apparatus for opposing motion of a member subjected to a plurality of vibratory forces of generally constant frequency and random phase the resultants of which are coplanar but non-concurrent, comprising at least two masses, resilient means individually connecting said masses to spaced apart points of the member in a plane generally parallel to the plane containing the lines of action of the resultants of said vibratory forces, each mass and its resilient means comprising a vibratory system having a natural frequency generally equal to said generally constant frequency for vibration along any axis or combination of axes parallel to said planes.

7. A vibratory counterforce according to claim 6 in which the resilient means are elastomer springs stressed in shear.

8. A vibratory counterforce according to claim 7 in which the elastomer springs are substantially circular in cross section.

9. A vibratory counterforce producing apparatus and vibratory system comprising, in combination, a vibratory work member, a base, resilient means connecting the work member to the base, means for vibrating the work member relative to the base at a substantially constant frequency, vibration isolators supporting the base from a support, and at least one vibratory counterforce, said counterforce comprising a mass and spring means forming the sole means connecting the mass to the base to form a vibratory system having a natural frequency generally equal to said constant frequency, said spring means having a spring rate that is independent of the direction of deflection of the spring, whereby said mass and spring means vibrates to provide a counterforce opposing any periodic disturbing forces applied to said base.

10. A vibratory counterforce producing apparatus and vibratory system according to claim 9, that includes at least two counterforces applied at spaced apart points of the base whereby rotational vibration of the base as well as translatory vibration is controlled.

* * * * *